United States Patent
Malik et al.

(10) Patent No.: US 9,575,621 B2
(45) Date of Patent: Feb. 21, 2017

(54) GAME EVENT DISPLAY WITH SCROLL BAR AND PLAY EVENT ICONS

(71) Applicant: Stadium Technology Company, Santa Clara, CA (US)

(72) Inventors: Kunaldeep Malik, Palo Alto, CA (US); Gideon Yu, Hillsborough, CA (US); Paraag Marathe, Menlo Park, CA (US); Kyle Jutte, San Francisco, CA (US); Patrick Weiss, San Francisco, CA (US); Jonathan Dubin, San Francisco, CA (US); Doug Garland, Palo Alto, CA (US); Mitch Huang, Palo Alto, CA (US); Chris Giles, Santa Clara, CA (US); Martin Manville, San Jose, CA (US); Mark Kilgore, San Francisco, CA (US)

(73) Assignee: VenueNext, Inc., Palo Alto, CA (US)

( * ) Notice: Subject to any disclaimer, the term of this patent is extended or adjusted under 35 U.S.C. 154(b) by 0 days.

(21) Appl. No.: 14/011,634

(22) Filed: Aug. 27, 2013

(65) Prior Publication Data

US 2015/0058780 A1 Feb. 26, 2015

Related U.S. Application Data

(60) Provisional application No. 61/870,178, filed on Aug. 26, 2013.

(51) Int. Cl.
G06F 3/0481 (2013.01)
G06F 3/0482 (2013.01)
(Continued)

(52) U.S. Cl.
CPC .......... *G06F 3/0481* (2013.01); *G06F 3/0482* (2013.01); *G06F 3/04855* (2013.01);
(Continued)

(58) Field of Classification Search
CPC ... G06F 3/0484; G06F 3/0481; G06F 3/04817
See application file for complete search history.

(56) References Cited

U.S. PATENT DOCUMENTS 4,292,507 A 9/1981 Hovorka
5,527,033 A 6/1996 Puma
(Continued)

OTHER PUBLICATIONS

U.S. Appl. No. 14/576,015, filed Dec. 18, 2014, Office Action, Mar. 11, 2015.
(Continued)

*Primary Examiner* — Ajay Bhatia
*Assistant Examiner* — Haimei Jiang
(74) *Attorney, Agent, or Firm* — Hickman Palermo Becker Bingham LLP

(57) ABSTRACT

A method is disclosed for receiving a plurality of play events associated with a sporting event, wherein each play event of the plurality of play events comprises a timestamp; for each of the play events, associating the play event with a sports team of a plurality of sports teams; for each of the play events, associating with the play event a particular icon from among a plurality of different icons based, at least in part, on the sports team that is associated with the play event; causing to display a bar in a graphical user interface of a mobile computing device, wherein the bar represents at least a portion of a time duration of the sporting event; for each of the play events, causing to display the particular icon at a position in the bar, wherein the position is based, at least in part, on the timestamp of the event.

28 Claims, 9 Drawing Sheets

(51) Int. Cl.
*G06F 3/0485* (2013.01)
*H04N 21/472* (2011.01)
*H04N 21/218* (2011.01)
*H04N 21/222* (2011.01)
*H04N 21/482* (2011.01)
*H04N 21/81* (2011.01)
*H04N 21/845* (2011.01)
*G11B 27/34* (2006.01)
*G11B 27/10* (2006.01)

(52) U.S. Cl.
CPC ............ *G11B 27/105* (2013.01); *G11B 27/34* (2013.01); *H04N 21/21805* (2013.01); *H04N 21/2223* (2013.01); *H04N 21/472* (2013.01); *H04N 21/47217* (2013.01); *H04N 21/482* (2013.01); *H04N 21/8133* (2013.01); *H04N 21/8456* (2013.01)

(56) References Cited

U.S. PATENT DOCUMENTS

| | | |
|---|---|---|
| 5,557,717 A | 9/1996 | Wayner |
| 5,636,920 A | 6/1997 | Shur et al. |
| 6,452,609 B1 | 9/2002 | Katinsky et al. |
| 6,545,689 B1 | 4/2003 | Tunli |
| 6,631,522 B1 | 10/2003 | Erdelyi |
| 6,681,398 B1 | 1/2004 | Verna |
| 6,795,638 B1 | 9/2004 | Skelley |
| 6,977,667 B1 | 12/2005 | Burke |
| 7,110,955 B1 | 9/2006 | Barhnart et al. |
| 7,791,607 B1 | 9/2010 | Hughes et al. |
| 8,214,741 B2 | 7/2012 | Errico et al. |
| 8,358,345 B1 | 1/2013 | Fiore et al. |
| 8,612,534 B1 | 12/2013 | Hossack |
| 8,634,708 B2 | 1/2014 | Chevallier et al. |
| 9,032,296 B1* | 5/2015 | Jeffs ............ H04N 21/2187 715/719 |
| 2002/0012526 A1 | 1/2002 | Sai |
| 2002/0040482 A1 | 4/2002 | Sextro |
| 2002/0191952 A1 | 12/2002 | Fiore et al. |
| 2003/0001880 A1 | 1/2003 | Holtz et al. |
| 2003/0063125 A1 | 4/2003 | Miyajima et al. |
| 2003/0074373 A1 | 4/2003 | Kaburgi et al. |
| 2003/0090504 A1 | 5/2003 | Brook et al. |
| 2003/0137531 A1 | 7/2003 | Katinsky et al. |
| 2004/0008225 A1 | 1/2004 | Campbell |
| 2004/0056879 A1 | 3/2004 | Erdelyi |
| 2004/0070594 A1 | 4/2004 | Burke |
| 2004/0095377 A1 | 5/2004 | Salandro |
| 2004/0205698 A1 | 10/2004 | Schliesmann |
| 2004/0226012 A1 | 11/2004 | Awada et al. |
| 2005/0005308 A1* | 1/2005 | Logan ............ G06Q 30/06 725/135 |
| 2005/0204294 A1 | 9/2005 | Burke |
| 2005/0210410 A1 | 9/2005 | Ohwa et al. |
| 2005/0246647 A1 | 11/2005 | Beam et al. |
| 2006/0020962 A1 | 1/2006 | Stark et al. |
| 2006/0170760 A1 | 8/2006 | Anderson |
| 2006/0277460 A1 | 12/2006 | Forstall et al. |
| 2006/0277481 A1 | 12/2006 | Forstall et al. |
| 2007/0118608 A1 | 5/2007 | Egli |
| 2007/0168543 A1 | 7/2007 | Krikorin et al. |
| 2007/0186183 A1 | 8/2007 | Hudson |
| 2007/0209018 A1 | 9/2007 | Lindemann |
| 2007/0245238 A1* | 10/2007 | Fugitt ............ G06F 3/0481 715/700 |
| 2007/0300157 A1* | 12/2007 | Clausi ............ G06F 3/04883 715/719 |
| 2008/0060001 A1 | 3/2008 | Logan et al. |
| 2008/0066011 A1* | 3/2008 | Urrabazo ............ H04N 5/765 715/810 |
| 2008/0066111 A1 | 3/2008 | Ellis et al. |
| 2008/0082922 A1 | 4/2008 | Biniak et al. |
| 2008/0086688 A1 | 4/2008 | Chandratillake et al. |
| 2008/0086755 A1* | 4/2008 | Darnell ............ H04N 5/44543 725/105 |
| 2008/0172615 A1 | 7/2008 | Igelman et al. |
| 2008/0238615 A1 | 10/2008 | Carpenter |
| 2008/0244453 A1* | 10/2008 | Cafer ................ G06F 3/04817 715/835 |
| 2008/0244456 A1* | 10/2008 | Shimizu ............ G06F 3/0481 715/840 |
| 2008/0305870 A1 | 12/2008 | Henderson |
| 2009/0070407 A1 | 3/2009 | Castle et al. |
| 2009/0124193 A1 | 5/2009 | Mitzel |
| 2009/0132924 A1 | 5/2009 | Vasa et al. |
| 2009/0143007 A1 | 6/2009 | Terlizzi |
| 2009/0158192 A1 | 6/2009 | De Peuter |
| 2009/0164569 A1 | 6/2009 | Garcia |
| 2009/0164902 A1 | 6/2009 | Cohen et al. |
| 2009/0164904 A1 | 6/2009 | Horowitz et al. |
| 2009/0288009 A1 | 11/2009 | Dulaney |
| 2009/0290848 A1 | 11/2009 | Brown |
| 2010/0005399 A1 | 1/2010 | Friedman et al. |
| 2010/0026809 A1 | 2/2010 | Curry |
| 2010/0035682 A1 | 2/2010 | Gentile et al. |
| 2010/0050198 A1 | 2/2010 | Mockry et al. |
| 2010/0077355 A1 | 3/2010 | Belinsky et al. |
| 2010/0278509 A1* | 11/2010 | Nagano ................ H04N 9/8227 386/230 |
| 2010/0287473 A1 | 11/2010 | Recesso et al. |
| 2010/0287592 A1 | 11/2010 | Patten et al. |
| 2010/0299183 A1 | 11/2010 | Fujioka |
| 2011/0013087 A1* | 1/2011 | House ................ A63B 24/0021 348/564 |
| 2011/0040760 A1 | 2/2011 | Fleischman |
| 2011/0066943 A1 | 3/2011 | Brillon et al. |
| 2011/0090402 A1 | 4/2011 | Huntington et al. |
| 2011/0113348 A1* | 5/2011 | Twiss .................... G06Q 10/10 715/753 |
| 2011/0154200 A1 | 6/2011 | Davis et al. |
| 2011/0169959 A1 | 7/2011 | DeAngelis et al. |
| 2011/0173214 A1* | 7/2011 | Karim ................ G06F 17/3002 707/754 |
| 2011/0246889 A1 | 10/2011 | Moore |
| 2011/0291945 A1 | 12/2011 | Ewing et al. |
| 2011/0316884 A1 | 12/2011 | Giambalvo et al. |
| 2012/0027379 A1 | 2/2012 | Thompson et al. |
| 2012/0078667 A1 | 3/2012 | Denker et al. |
| 2012/0087637 A1 | 4/2012 | Logan et al. |
| 2012/0130741 A1 | 5/2012 | Sparandara et al. |
| 2012/0131507 A1* | 5/2012 | Sparandara ........... G06F 19/322 715/833 |
| 2012/0166955 A1 | 6/2012 | Bender |
| 2012/0166964 A1 | 6/2012 | Tseng |
| 2012/0179969 A1 | 7/2012 | Lee et al. |
| 2012/0189273 A1* | 7/2012 | Folgner ................ H04N 9/8227 386/241 |
| 2012/0192121 A1 | 7/2012 | Bonnat |
| 2012/0192227 A1 | 7/2012 | Fleischman |
| 2012/0246567 A1 | 9/2012 | Brahms et al. |
| 2012/0260211 A1* | 10/2012 | Sathish .................. G06Q 30/02 715/784 |
| 2012/0311447 A1 | 12/2012 | Chisa et al. |
| 2012/0324357 A1 | 12/2012 | Viegers et al. |
| 2013/0036369 A1* | 2/2013 | Mitchell ................ G06Q 50/00 715/753 |
| 2013/0047085 A1* | 2/2013 | Roberts ............ H04N 21/4788 715/716 |
| 2013/0055128 A1 | 2/2013 | Muti et al. |
| 2013/0080968 A1 | 3/2013 | Hanson et al. |
| 2013/0086501 A1* | 4/2013 | Chow ................ G06F 17/30551 715/772 |
| 2013/0095909 A1* | 4/2013 | O'Dea .................. G07F 17/323 463/25 |
| 2013/0132836 A1 | 5/2013 | Ortiz |
| 2013/0157735 A1* | 6/2013 | Amaitis ................ G06Q 50/34 463/6 |

(56) References Cited

U.S. PATENT DOCUMENTS

| | | | |
|---|---|---|---|
| 2013/0178284 A1 | 7/2013 | Hughes et al. | |
| 2013/0227596 A1* | 8/2013 | Pettis | H04N 21/2353 725/13 |
| 2013/0275151 A1* | 10/2013 | Moore | G06Q 10/10 705/3 |
| 2013/0300937 A1 | 11/2013 | Williams et al. | |
| 2013/0321388 A1 | 12/2013 | Locke | |
| 2013/0324245 A1 | 12/2013 | Harvey | |
| 2014/0046802 A1 | 2/2014 | Hosein | |
| 2014/0059491 A1 | 2/2014 | Kim | |
| 2014/0081903 A1* | 3/2014 | Koosel | G06F 17/30563 707/602 |
| 2014/0082506 A1 | 3/2014 | Maxwell et al. | |
| 2014/0129559 A1 | 5/2014 | Estes | |
| 2014/0192204 A1 | 7/2014 | Glazer et al. | |
| 2014/0195918 A1 | 7/2014 | Friedlander | |
| 2014/0213357 A1* | 7/2014 | Claffey | A63F 13/65 463/31 |
| 2014/0214983 A1 | 7/2014 | Hossack | |
| 2014/0253431 A1 | 9/2014 | Gossweiler et al. | |
| 2014/0258859 A1 | 9/2014 | Plumb | |
| 2014/0282745 A1* | 9/2014 | Chipman | H04N 21/47214 725/61 |
| 2014/0337763 A1* | 11/2014 | Feldstein | G06F 3/0481 715/753 |
| 2014/0364974 A1 | 12/2014 | Wohl | |
| 2015/0058730 A1 | 2/2015 | Dubin et al. | |
| 2015/0058780 A1 | 2/2015 | Malik et al. | |
| 2015/0058781 A1 | 2/2015 | Malik et al. | |
| 2015/0248917 A1* | 9/2015 | Chang | H04N 13/0011 386/282 |

OTHER PUBLICATIONS

U.S. Appl. No. 14/011,659, filed Aug. 27, 2013, Interview Summary, May 14, 2015.
U.S. Appl. No. 14/011,669, filed Aug. 27, 2013, Office Action, Jun. 2, 2015.
U.S. Appl. No. 14/011,669, filed Aug. 27, 2013, Interview Summary, Jul. 10, 2015.
Goodell, "Official Playing Rules and Casebook of the National Football League", dated 2011, http://www.nfl.com/static/content/public/image/rulebook/pdfs/2011_Rule_Book.pdf, in 2 parts.
U.S. Appl. No. 14/559,605, filed Dec. 3, 2014, Office Action, Nov. 9, 2015.
U.S. Appl. No. 14/011,669, filed Aug. 27, 2013, Advisory Action, Nov. 26, 2014.
U.S. Appl. No. 14/011,659, filed Aug. 27, 2013, Office Action, Oct. 23, 2014.
U.S. Appl. No. 14/576,015, filed Dec. 18, 2014, Advisory Action, Feb. 16, 2016.
U.S. Appl. No. 14/559,605, filed Dec. 3, 2014, Interview Summary, Feb. 19, 2016.
U.S. Appl. No. 14/011,659, filed Aug. 27, 2013, Office Action, Nov. 19, 2013.
U.S. Appl. No. 14/576,015, filed Dec. 18, 2014, Final Office Action, Oct. 7, 2015.
U.S. Appl. No. 14/576,007, filed Dec. 18, 2014, Office Action, Apr. 29, 2015.
U.S. Appl. No. 14/576,007, filed Dec. 18, 2014, Final Office Action, Aug. 28, 2015.
Nessman, "ESPN Gamecast a Sweet Way to Keep Up With a Game", dated Jan. 23, 2012, http://kfmx.com/espn-gamecast-a-sweet-way-to-keep-up-with-a-game/, 1 page.
U.S. Appl. No. 14/011,659, filed Aug. 27, 2013, Office Action, Aug. 12, 2016.
U.S. Appl. No. 14/559,605, filed Dec. 3, 2014, Notice of Allowance.

* cited by examiner

GAME EVENT DISPLAY WITH SCROLL BAR AND PLAY EVENT ICONS

CROSS-REFERENCE TO RELATED APPLICATIONS; BENEFIT CLAIM

This application claims the benefit of U.S. Provisional Application No. 61/870,178 filed Aug. 26, 2013, the entire contents of which are hereby incorporated by reference for all purposes as if fully set forth herein, under 35 U.S.C. §119(e).

TECHNICAL FIELD

The present disclosure relates to displaying information about game plays for sporting events in the context of computer display devices. The disclosure relates more specifically to techniques for displaying a scrolling summary of game plays associated with a sporting event in mobile computing devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Certain games, or sporting events, are comprised of plays. A play may be a series of movements by at least one player, frequently in concert with a team of players, to score points, achieve a goal, or advance the position of a team, ball, puck, or other object(s). Examples include plays in the American game of football. Frequently, another player, or team of players, acts in opposition to prevent advancement.

Fans frequently review game plays for the purpose of experiencing the play again, viewing details of the play, or analysis of the play or the game. For example, fans will review one or more plays in which a score was made. Accordingly, plays may be made available to fans to review. One method of presenting reviewable plays is to list plays in chronological order. However, merely listing plays consecutively in chronological order may be overwhelming and difficult for a fan to find a particular play that the fan wants to review. Furthermore, fans may not remember at which point during a game a particular play occurred. Therefore, there is a need for improved techniques of displaying information about game plays.

SUMMARY OF THE INVENTION

The appended claims may serve as a summary of the invention.

DETAILED DESCRIPTION

Figure 1A:
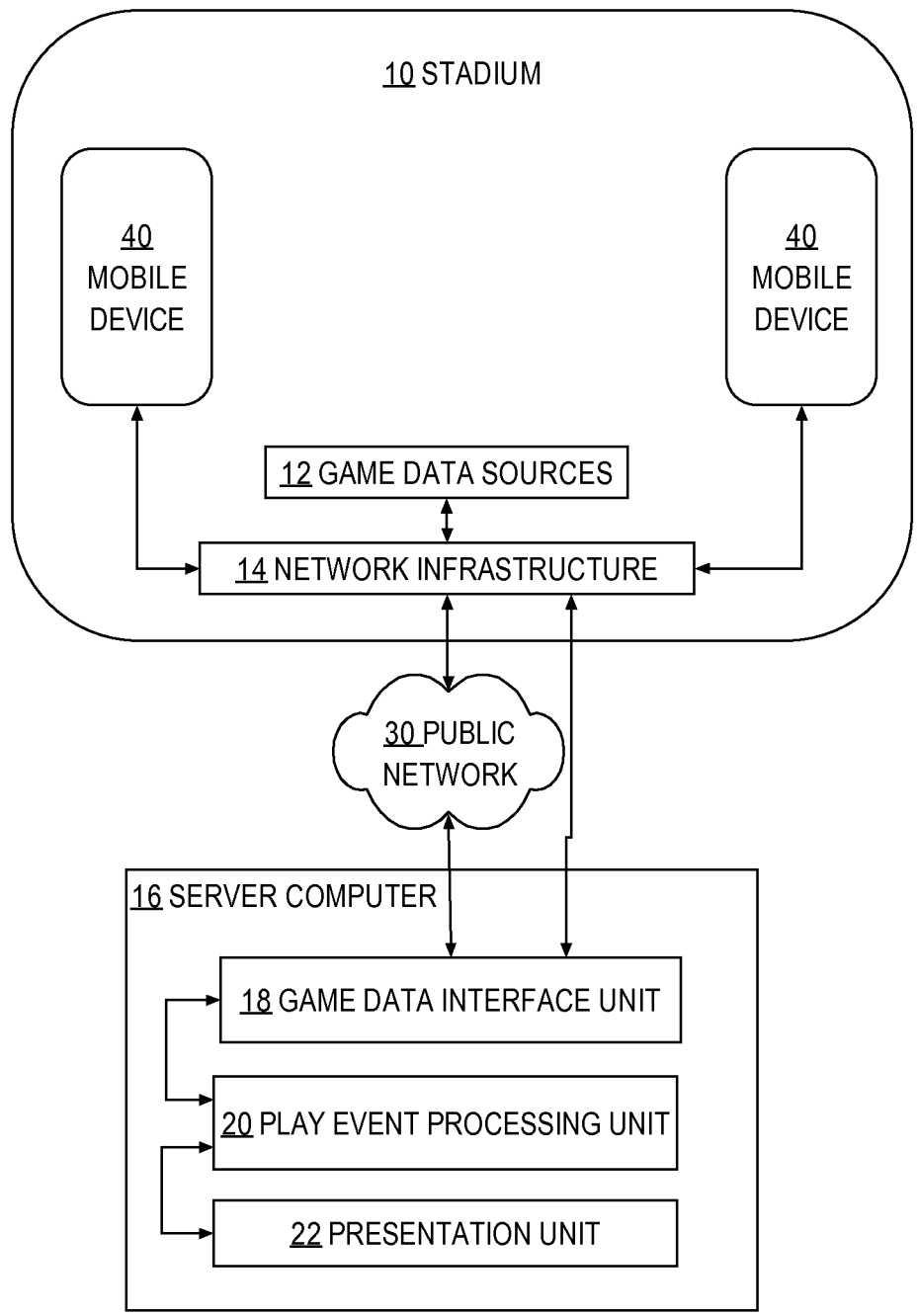
FIG. 1A illustrates an example networked computer system configured to process game play event data and provide display data useful in mobile computing devices.

Techniques for displaying a scroll bar with play event icons associated with a sporting event are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
        2.1 Technical Context
        2.2 Play Events
        2.3 Process Overview
        2.4 Updating Play Event Icons and Generating Markers
        2.5 Filtering Play Event Icons
    3.0 Example Graphical User Interface with Scrolling and Icons
        3.1 Graphical Tiles
        3.2 Play Event Icons
        3.3 Markers
        3.4 Frames and Indicators
        3.5 Video Scrub Bar
        3.6 Application
    4.0 Implementation Mechanisms—Hardware Overview
    5.0 Extensions and Alternatives

1.0 GENERAL OVERVIEW

Displaying a scroll bar with play event icons associated with a sporting event is described. In an embodiment, a method comprises receiving a plurality of play events associated with a sporting event, wherein each play event of the plurality of play events comprises a timestamp; for each play event in the plurality of play events, associating the play event with a sports team of a plurality of sports teams; for each event in the plurality of play events, associating with the play event a particular icon from among a plurality of different icons based, at least in part, on the sports team that is associated with the play event; causing to display a bar in a graphical user interface of a mobile computing device, wherein the bar represents at least a portion of a time duration of the sporting event; for each play event in the plurality of play events, causing to display the particular icon at a particular linear position in the bar, wherein the position is based, at least in part, on the timestamp of the event.

In some embodiments, the particular icon may be associated with the play event. Additionally or alternatively, each play event of the plurality of play events may be associated with an event type; for each play event in the plurality of play events, the particular icon may be determined based, at least in part, on the event type that is associated with the event.

In some embodiments, each play event in the plurality of play events comprises an importance field. Additionally, the new play event may be determined to be important based, at least in part, on the importance field, and in response: the new play event may be associated with one of the plurality of sports teams; a new particular icon may be determined based, at least in part, on the sports team that is associated with the new play event; the new particular icon may be displayed in the bar. The position of the new particular icon in the bar may be based, at least in part, on the new timestamp.

In some embodiments, a selection of a particular team may be received. In response to the selection, the plurality of play events may be filtered. The icons that are associated with each play event in the plurality of play events that is associated with the particular team may be displayed. Additionally, the icons that are associated with each play event in the plurality of play events that is not associated with the particular team may be caused to not be displayed.

In some embodiments, each play event of the plurality of play events may be associated with an event type. Furthermore, a selection of a particular event type may be received. In response to the selection, the plurality of play events may be filtered. The icons that are associated with each play event in the plurality of play events that is associated with the particular event type may be displayed. Additionally, the icons that are associated with each play event in the plurality of play events that is not associated with the particular event type may be caused to not be displayed.

In some embodiments, game play data is received. In response to receiving the game play data, for each play event in the plurality of play events, the position of the icon in the bar for the play event is updated.

In some embodiments, a time for one or more time markers is determined, such that each time marker of the one or more time markers includes a time. For each time marker in the one or more time markers, a time marker icon is displayed in the bar, such that the position of the time marker icon is based, at least in part, on the time of the time marker. Additionally, each time marker may indicate a quarter number or period of the sporting event.

In some embodiments, the bar is a scroll bar that is displayed adjacent to a scrollable set of graphical tiles, and each of the graphical tiles displays data for one of the play events among the plurality of play events.

In some embodiments, the bar comprises a linearly movable and expandable frame that is displayed adjacent to a scrollable set of graphical tiles, each of the graphical tiles comprising data for one of the play events among the plurality of play events. Additionally, the frame may be displayed in a collapsed format at a present game point of the bar. Input for sliding the frame along the bar away from the present game point may be received. In response, the frame may be displayed in an enlarged format that covers one or more of the icons and in a size that corresponds to a number of the graphical tiles that are displayed.

In some embodiments, the bar comprises a linearly movable and expandable frame, with a selectable portion, that is displayed adjacent to a scrollable set of graphical tiles, each of the graphical tiles comprising data for one of the play events among the plurality of play events. Additionally, the frame may be displayed in a collapsed format at a present game point of the bar. Input may be received for determining the selectable portion is selected. Input may also be received for sliding the frame along the bar away from the present game point. In response, the frame may be displayed in an enlarged format that covers one or more of the icons. Furthermore, a set of graphical tiles that correspond with the one or more of the covered icons may be displayed.

In some embodiments, the bar comprises a linearly movable and expandable indicator that is displayed within the bar, which is adjacent to a scrollable set of graphical tiles, each of the graphical tiles comprising data for one of the play events among the plurality of play events. Additionally, the indicator may be displayed in a collapsed format at a present game point of the bar. Input for sliding the indicator along the bar away from the present game point may be received. In response, the indicator may be displayed in an enlarged format that underscores one or more of the icons and in a size that corresponds to a number of the graphical tiles that are displayed.

In some embodiments, each of the play events represents a play in the sporting event. Additionally or alternatively, each of the play events represents a set of field movements, or drive which comprises one or more plays, in the sporting event. Additionally or alternatively, a play event may comprise a set of one or more other play events.

In other embodiments, the invention encompasses a computer apparatus and a computer-readable medium configured to carry out the foregoing steps.

2.0 STRUCTURAL AND FUNCTIONAL OVERVIEW

2.1 Technical Context

FIG. 1A illustrates an example networked computer system configured to process game play event data and provide display data useful in mobile computing devices. In an embodiment, a stadium 10 comprises a site at which a sporting event or game is played. Stadium 10 broadly represents any form of arena, field, ground or grounds, park, or other place at which a sporting event may be played or undertaken. Typically stadium 10 comprises a playing field, pitch, track or other game play facility, seating for public attendees, and fixed or mobile facilities for technical personnel who are involved in producing a broadcast, telecast, or other recording of the sporting event. Various embodiments may include stadiums 10 of any size and this disclosure specifically contemplates the use of stadiums with seating for any of a few hundred to in excess of 50,000 attendees or fans.

One or more game data sources 12 are positioned within or near the stadium and are configured to obtain or record data about game play. Examples of game data sources include television or video cameras, sound recording equipment, computers associated with statisticians or game coverage personnel, and support infrastructure for any of the foregoing. Output of game data sources 12 may include digital or analog audiovisual feeds representing television or video of the game, pure digital data or structured data comprising metadata for the game or play events, transcripts, commentary, and other data representing the game or play events.

Game data sources 12 are communicatively coupled to network infrastructure 14 in stadium 10. Network infrastructure 14 may comprise wired network interfaces, wireless access points, routers, switches, access servers, authentication servers, cabling, and related networking or internetworking equipment or gear.

In an embodiment, network infrastructure is coupled to one or more public networks 30 which may comprise any of a LAN, WAN, internetworks, or internets. In an embodiment, a server computer 16 is coupled to the network 30; additionally or alternatively, the server computer may have a direct connection to the network infrastructure, for example, when the server computer is co-located with the stadium 10 or located nearby.

A plurality of mobile devices 40 are coupled to network infrastructure 14 and are located within stadium 10. In various embodiments, mobile devices 40 may comprise any of smartphones, tablet computers, personal digital assistants, netbook computers, ultrabook computers, laptop computers or other mobile devices. In one embodiment, the mobile devices 40 are associated with attendees of stadium 10 and there may be thousands of mobile devices having concurrently active connections to the network infrastructure 14. Connections may be wired, or may be wireless via wireless access points that are located throughout stadium 10 in positions adjacent to seats in the stadium or in other locations capable of establishing and maintaining multiple concurrent connections to the mobile devices 40.

Server computer 16 in FIG. 1A broadly represents one or more physical computers, clusters, or processors in cloud service providers or data centers. In various embodiments, any number of such computers may be used. In one embodiment, server computer 16 comprises a game data interface unit 18, a play event processing unit 20, and a presentation unit 22. In an embodiment, game data interface unit 18 is configured to request and/or receive game play event data from game data sources 12 and to format, transform, or otherwise process the game play event data for use in other functional units. For example, game data interface unit can perform buffering, classification and categorization functions.

In an embodiment, the play event processing unit 20 is configured to perform filtering, selection, association and other functions in the manner described further herein in connection with the process diagrams.

In an embodiment, the presentation unit 22 is configured to generate data that can drive displays of external computing devices such as smartphones, tablet computers, other mobile devices, personal computers, web browsers, and other systems. For example, in one embodiment the presentation unit may implement an HTTP server and/or one or more mobile device server-side applications that can interoperate with compatible client-side applications or "apps" on the mobile computing devices 40 to provide data that the apps are capable of rendering in a graphical user interface on the mobile computing devices. Specific example embodiments of screen displays for a mobile computing device user interface are described further herein.

2.2 Play Events

In an embodiment, a play event may include, or reference, a recorded segment of a game. For example, a play event may include a play in a sporting event recorded by one or more devices and stored on one or more non-transitory storage media. "Recorded," in this sense, includes obtaining pictures, sound, or data, or a combination, relating to a segment of a game as the game is played, and also includes replaying previously recorded pictures, sound and/or data for a segment of a game that was played in the past. Thus, a segment of a game may be transiently recorded as it occurs, or replayed from stored audiovisual data. Alternatively or additionally, a play event may include, or reference, a series of plays in a sporting event. A series of plays may include a set of field movements or drives. The series of plays may be continuous and linear in time. Additionally or alternatively, a drive may begin when a team first gains possession of the ball, and may conclude when one or more conditions are satisfied: the possessing team scores a goal, the possessing team loses possession of the ball, and/or a particular time period ends. Additionally or alternatively, a drive may be determined by analyzing text, such as the description, in one or more play events. For example, if a play event description indicates a team receives possession of the ball, the play event may indicate the beginning of a drive. Similarly, if a play event description indicates the team scores, the play event may indicate the end of a drive. Additionally or alternatively, the series of plays may be recorded segments of a game stitched together from disjoint time periods, from various points of view, and/or highlighting one or more players or teams. For example, a play event may include, or reference, a series of video clips stitched together of a team receiving a ball, proceeding to the other end of the playing field, and scoring one or more points. Alternatively or additionally, a play event may include, or reference, a plurality of play events.

A play event may be associated with one or more event types. For example, in American football, a play event may be associated with "interceptions", "punts", "drives", "scoring plays", "touchdowns", "field goals", "penalties," "personal fouls", "special teams plays," "big offensive plays", and/or "big defensive plays".

A play event may be associated with a particular team. For example, a play event may be associated with a team that has possession of the ball at the beginning and/or end of a particular play. Additionally or alternatively, a play event may be associated with one or more teams to indicate that the one or more teams are highlighted in the play event. Additionally or alternatively, a play event may be associated with a team by an operator. Additionally or alternatively, a play event may be associated with a team automatically.

A play event may be associated with one or more players. For example, one or more players may be highlighted in a play event. Accordingly, the play event may be associated with each of the highlighted players.

A play event may include, or reference, one or more statistics or game states. For example, a play event may include the yards gained during the game play, the score, the number of points one or more players have scored, the state of the game play clock at the beginning and/or end of the play event, the number of plays contained in the play event, the length of the play event, the game-clock time or actual time each play event covers, and a time in one or more time zones.

2.3 Process Overview

Figure 1B:
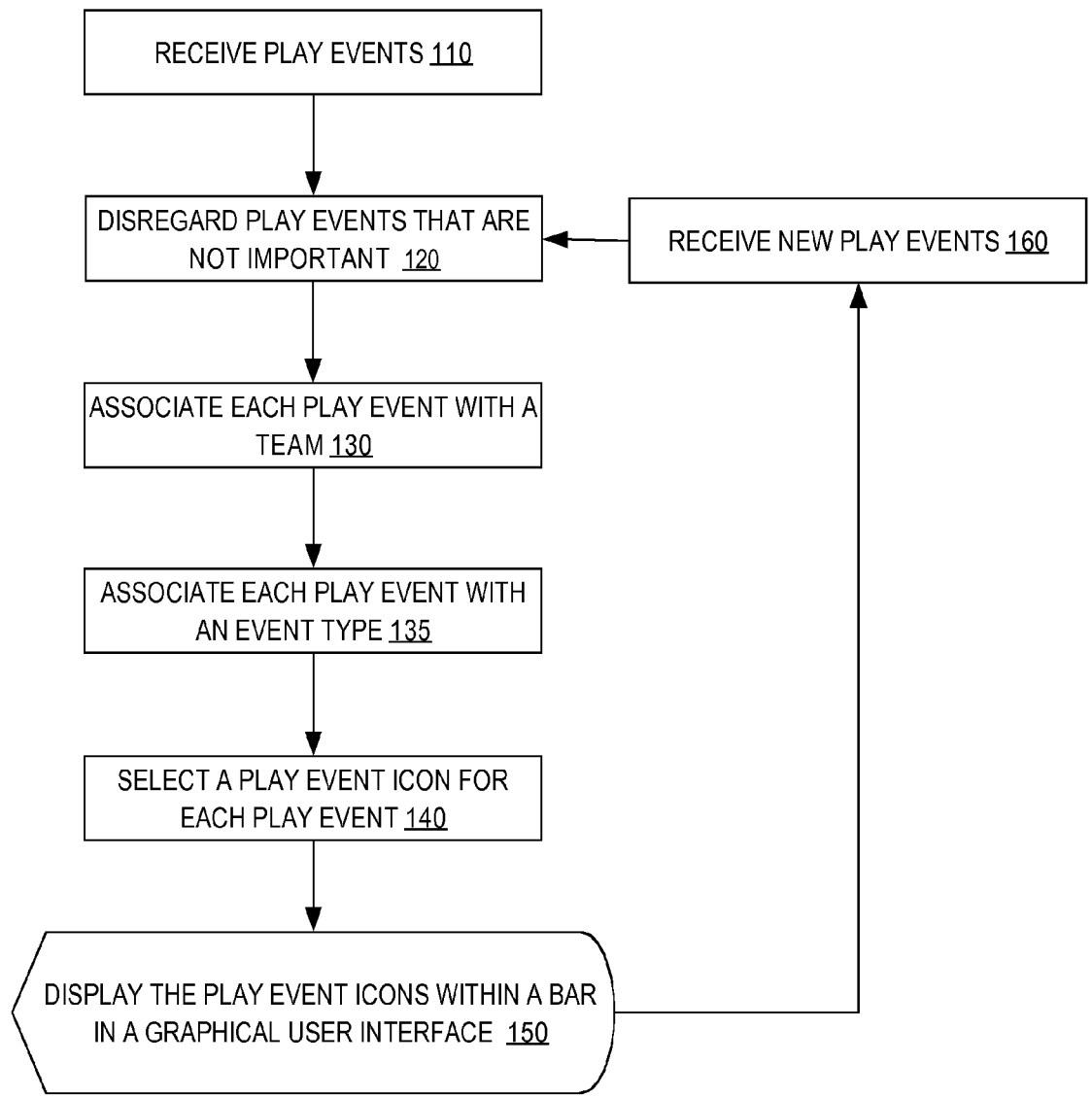
FIG. 1B illustrates a process for receiving play events, and displaying play event icons corresponding to the received play events in a bar within a graphical user interface, according to an embodiment.

FIG. 1B illustrates a process for receiving play events, and displaying play event icons corresponding to the received play events in a bar within a graphical user interface, according to an embodiment. While FIG. 1B illustrates example steps according to an embodiment, other embodiments may omit, add to, reorder, and/or modify any of the steps shown. Referring now to FIG. 1B, in step 110, an application receives play events. For example, the application receives a plurality of play events from a server or a server application. The play events may be formatted in extensible markup language, binary, a proprietary format, and/or any other format readable by the application.

In step 120, the application disregards play events that are not important. For example, each play event may include a field, which when selected designates that the play event is important. Accordingly, the application may disregard any play event if the play event field "important" is not selected.

In step 130, the application associates each play event with a team. For example, each play event may include a field that designates a team to associate the play event with. Accordingly, the application may associate each play event with its designated team. Alternatively or additionally, the application may determine which team a play event should be associated with based, at least in part, on other data included in the play event.

In step 135, the application associates each play event with an event type. For example, each play event may include a field that designates one or more event types. Accordingly, the application may associate each play event with the one or more designated event types. Additionally or alternatively, the application may determine which event types a play event should be associated with based, at least in part, on other data included in the play event.

In step 140, the application selects a play event icon for each play event. For example, the application may select each play event icon based, at least in part, on the team associated with the play event (determined in step 130) and/or the event type associated with the play event (determined in step 135).

In step 150, the application displays the play event icons within a bar in a graphical user interface. For example, for each play event, the application displays the selected play event icon in a scroll bar. The position of each play event icon in the scroll bar may be based, at least in part, on the data in each corresponding play event.

In step 160, the application receives new play events. For example, the application may receive one or more new play events. Accordingly, the application repeats steps 120 through 150 for the newly received play events.

2.4 Updating Play Event Icons and Generating Markers

Figure 2:
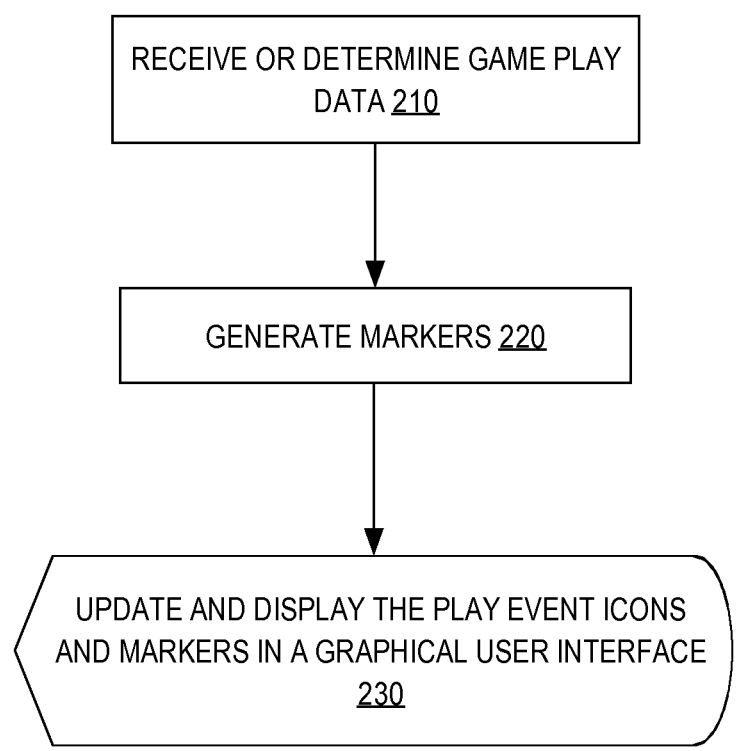
FIG. 2 illustrates a process for receiving and/or determining game play data, generating markers, updating existing play event icons and markers, and displaying the updated play event icons and markers, in an example embodiment.

FIG. 2 illustrates a process for receiving and/or determining game play data, generating markers, updating existing play event icons and markers, and displaying the updated play event icons and markers, in an example embodiment. While FIG. 2 illustrates example steps according to an embodiment, other embodiments may omit, add to, reorder, and/or modify any of the steps shown. Referring now to FIG. 2, in step 210, an application receives and/or determines game play data. For example, an application may receive game play data from a server or a server application. The game play data may be in formatted extensible markup language, binary, a proprietary format, and/or any other format readable by the application. The game play data may include play events or other data related to the game, such as the current game clock time, the current score, or the current position of a team or ball.

In step 220, the application generates markers. For example, in response to receiving game play data that the game clock has been reset for a new quarter, the application may generate a marker, which indicates the beginning of the new quarter.

In step 230, the application updates and displays the play event icons and markers in a graphical user interface. For example, in response generating the marker in step 220, the application may display the marker. Furthermore, in response to receiving the game play data in step 220, the application may update the position of the play event icons and previously displayed markers.

2.5 Filtering Play Event Icons

Figure 3:
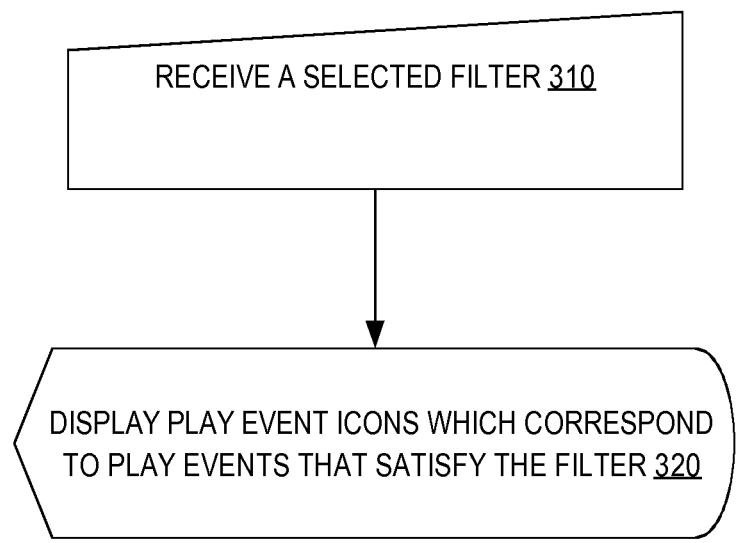
FIG. 3 illustrates a process for receiving and applying a filter to the received play events, and displaying the play event icons that correspond to the play events that satisfy the filter, in an example embodiment.

FIG. 3 illustrates a process for receiving and applying a filter to the received play events, and displaying the play event icons that correspond to the play events that satisfy the filter, in an example embodiment. While FIG. 3 illustrates example steps according to an embodiment, other embodiments may omit, add to, reorder, and/or modify any of the steps shown. Referring now to FIG. 3, in step 310, an application receives a selected filter. For example, an application may receive user input which indicates play event icons should be displayed which correspond to play events that are associated with a particular team and are also associated with a scoring play.

In step 320, the application displays play event icons which correspond to play events that satisfy the filter. For example, the application may remove from display any play event icons that do not correspond to a play event, which is not associated with the particular team or a scoring play. Furthermore, the application may cause to display play event icons that correspond to play events that are associated with the particular team and are associated with a scoring play.

3.0 EXAMPLE GRAPHICAL USER INTERFACE WITH SCROLLING AND ICONS

Play events may be displayed in an application executed on a mobile device 40 for users to scroll through and view. FIG. 4A, FIG. 4B, FIG. 4C, and FIG. 4D illustrate an annotated scroll bars and game-state markers, in various example embodiments. FIG. 4A, FIG. 4B, FIG. 4C, and FIG. 4D illustrate various example embodiments for purposes of illustrating clear examples, other embodiments may omit add to, reorder, and/or modify any of the elements shown. In the embodiment illustrated in FIG. 4A, FIG. 4B, FIG. 4C, and FIG. 4D, application 400 includes graphical tile list 405 and bar 450. Bar 450 includes play event icons 460, 462, 464, 466, and 468, and markers 471, 472, and 473.

3.1 Graphical Tiles

Figure 4A:
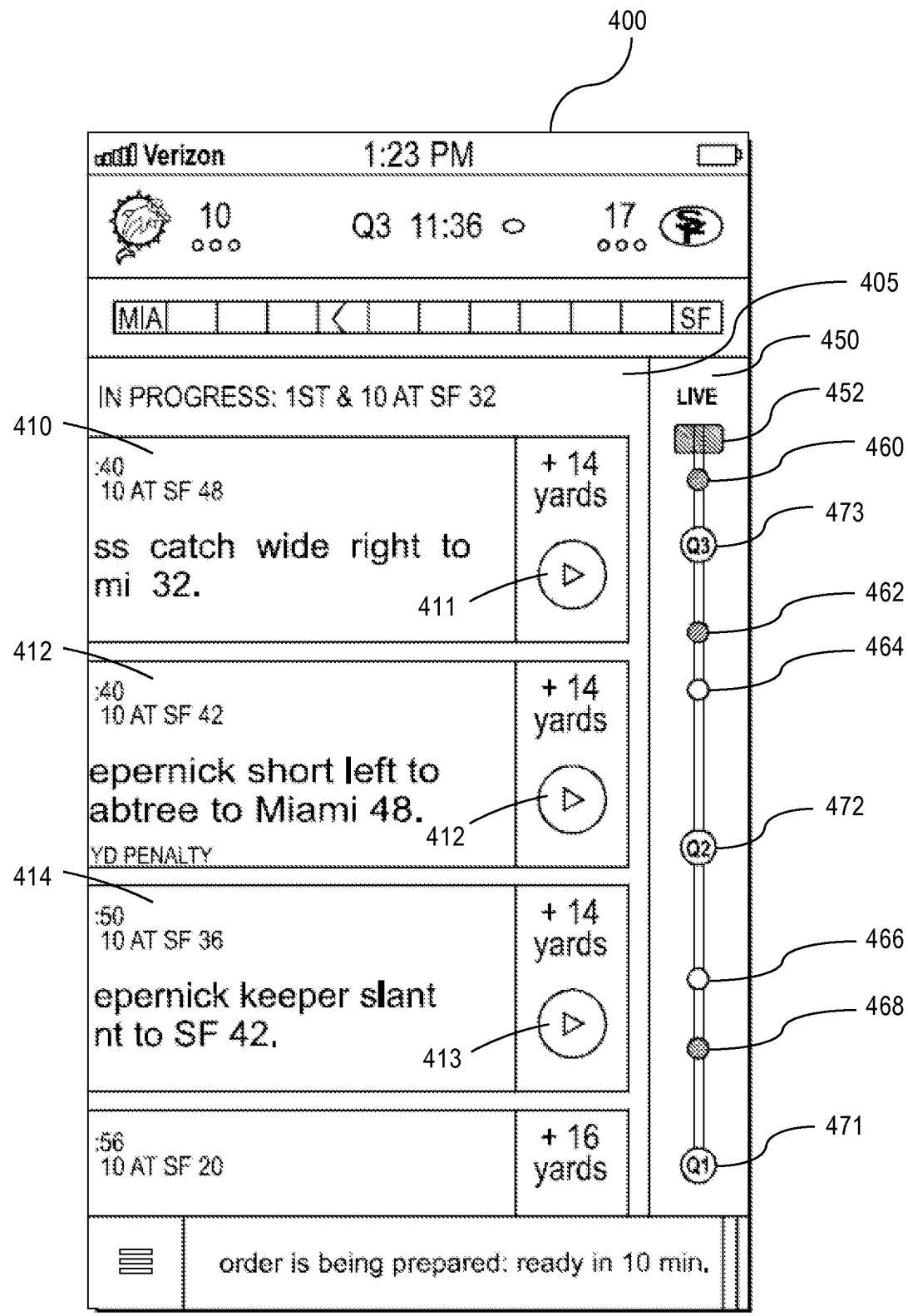
FIG. 4A illustrates an annotated scroll bar with a compressed frame and game-state markers, in an example embodiment.
Figure 4B:
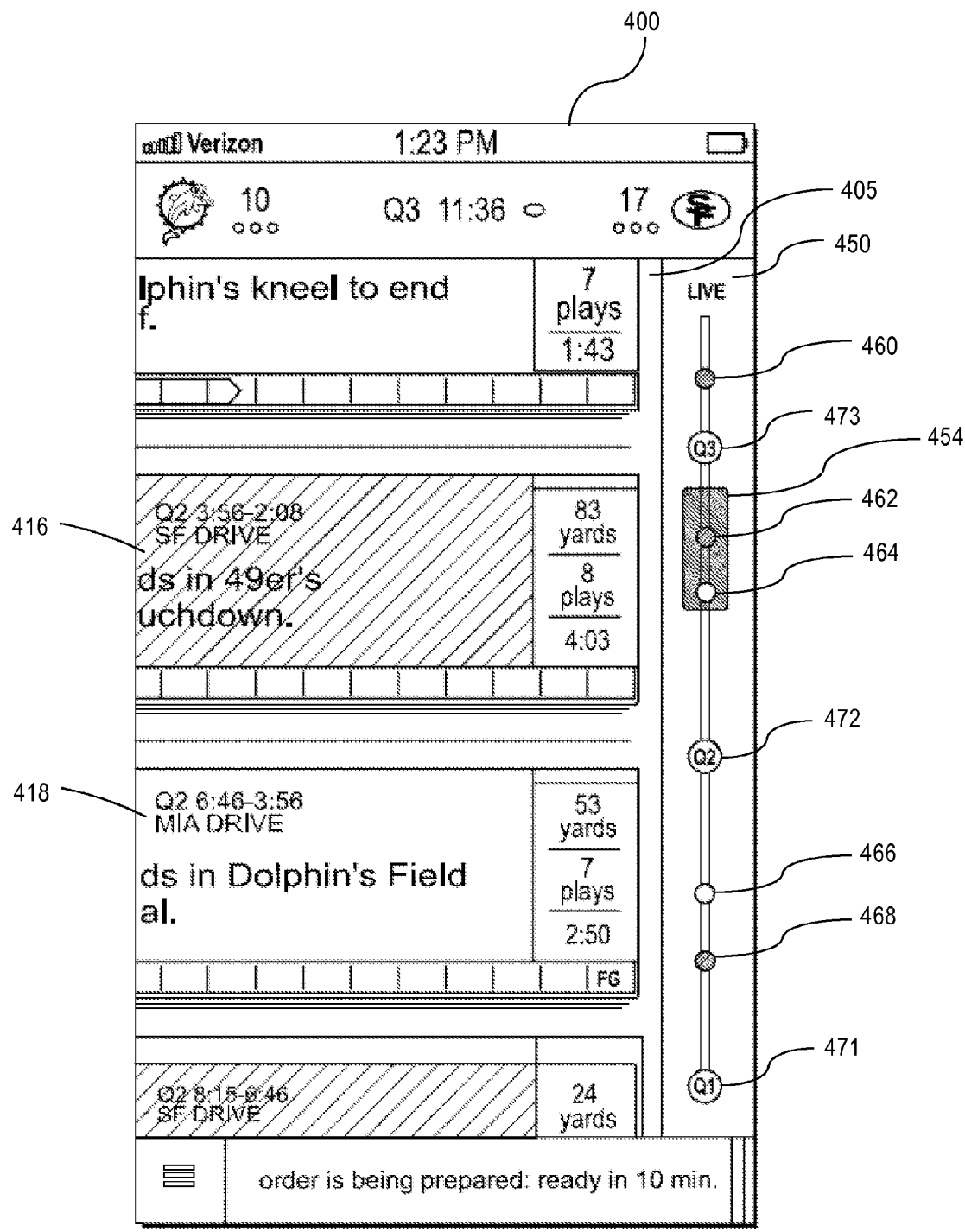
FIG. 4B illustrates an annotated scroll bar with an expanded frame and game-state markers, in an example embodiment.
Figure 4C:
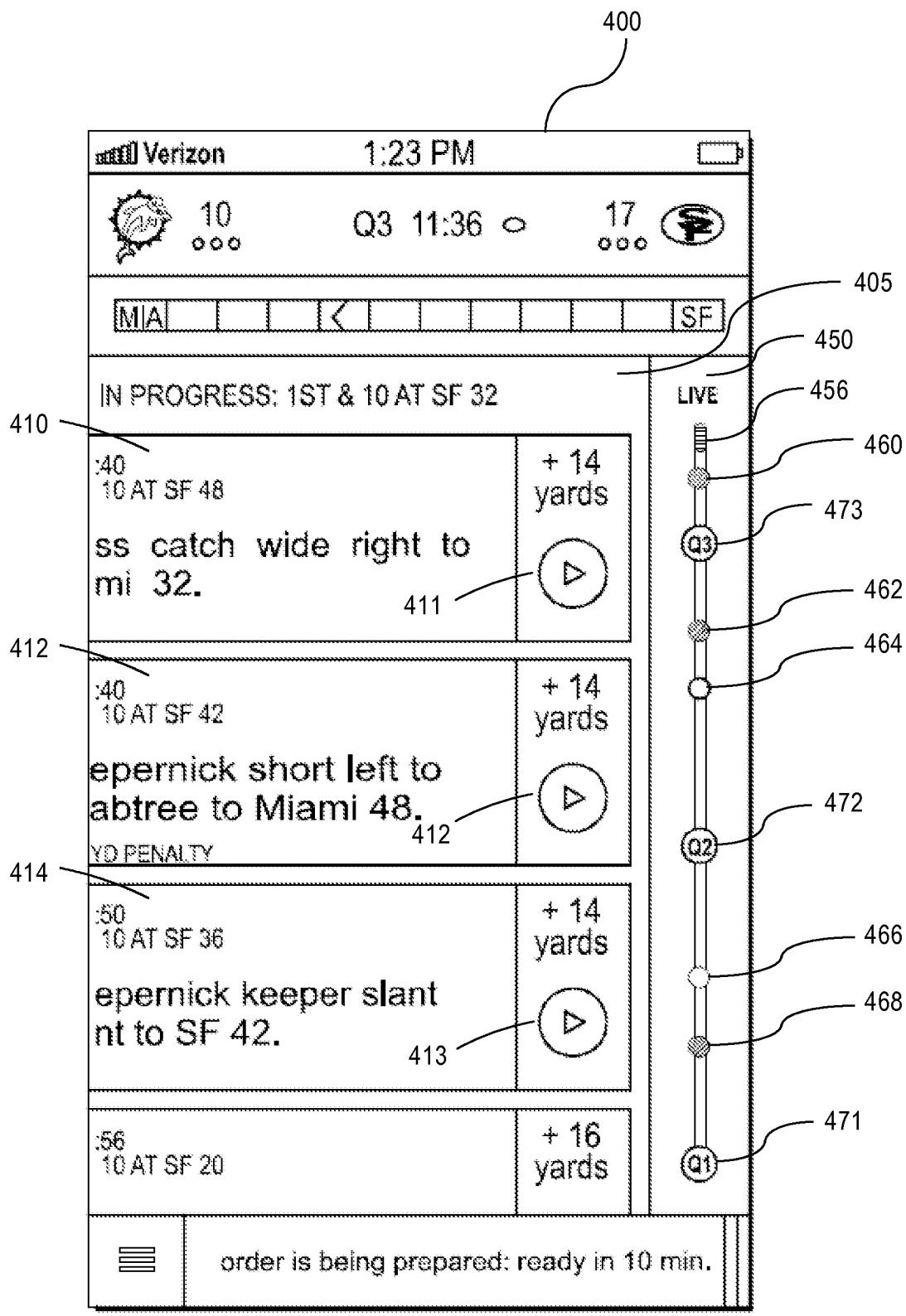
FIG. 4C illustrates an annotated scroll bar with a compressed indicator and game-state markers, in an example embodiment.
Figure 4D:
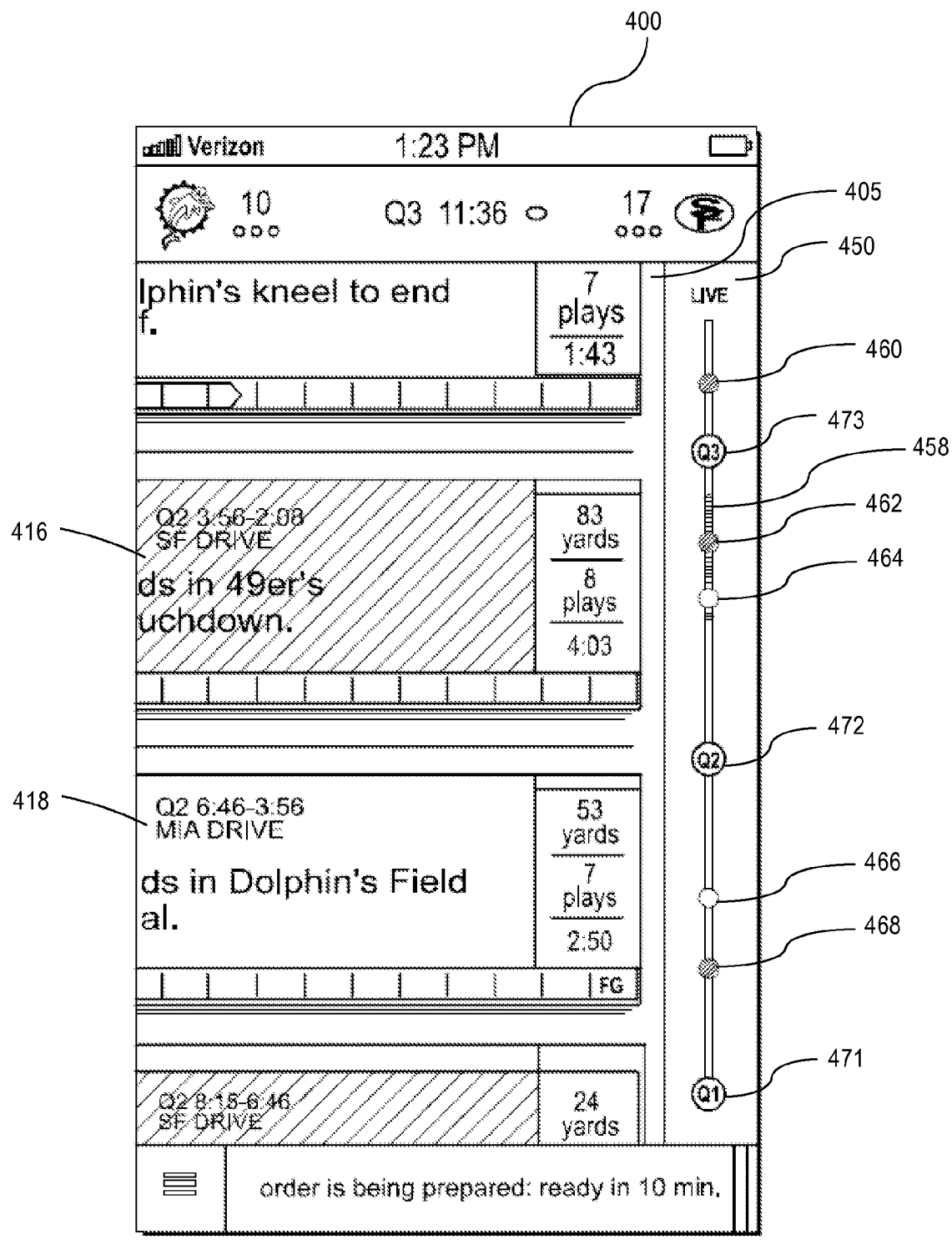
FIG. 4D illustrates an annotated scroll bar with an expanded indicator and game-state markers, in an example embodiment.

In FIGS. 4A and 4C, graphical tile list 405 includes graphical tile 410, graphical tile 412, and graphical tile 414. In FIG. 4B and FIG. 4D, graphical tile list 405 includes graphical tile 416 and graphical tile 418. Graphical tiles 410, 412, 414, 416, and 418 may each be associated with, and/or correspond to, a play event, and may include the data included in the play event. For example, graphical tiles 410, 412, and 414 include a description from the corresponding play event, which refers to one play during a game. Also for example, graphical tiles 416 and 418 each include a description from the corresponding play event, which refers to multiple plays stitched together that replay a drive for a particular team.

Graphical tiles 410, 412, 414, 416, and 418 may include other information determined by application 400 or included in the corresponding play event. For example, a graphical tile may include the corresponding play event statistics, such as the state of the game play clock, the position of the ball, and/or the score at the end of the play event. Also for example, the graphical tile may include the corresponding play event description.

Graphical tiles may be visually different. For example, graphical tiles 410, 412, and 414 are visually different than graphical tiles 416 and 418. Graphical tiles 410, 412, and 414 include links 411, 413, and 415, respectively, which may link to a video and/or audio recording of one or more plays. Accordingly, when any of links 411, 413, or 415 are selected by a user, the linked media may be presented to the user. In contrast, the entire graphical tile of graphical tiles 416 and 418 may be a link to the media referenced in the corresponding play event. Accordingly, when either of graphical tiles 416 or 418 is selected by a user, the linked media may be presented to the user. Alternatively or additionally, in response to a user selecting either graphical tiles 416 or 418, each of which may correspond to a play event that comprises a set of play events, new graphical tiles may be displayed to the user which each represent a single play event in the set of play events.

Graphical tiles may be color coded based, at least in part, on the corresponding play event. For example, graphical tile 416 is shaded differently than graphical tile 418. Also, for the purpose of illustrating a clear example, assume that the play event corresponding with graphical tile 416 is associated with the first team. Accordingly, graphical tile 416 may be displayed with a first color. Further assume that the play event corresponding with graphical tile 418 is associated with a second team. Accordingly, graphical tile 418 may be displayed with a second, different color. The color(s) assigned to a graphical tile may be designated in the graphical tile's corresponding play event, or the team color(s) of the team associated with the corresponding play event.

Graphical tiles may also be visually different based, at least in part, on the data included in the corresponding play event. For example, graphical tile 416 includes a different description than graphical tile 418, since graphical tile 416 corresponds to a different play event than graphical tile 418.

Graphical tiles also may be visually different based, at least in part, on the event types associated with the corresponding play event. For example, a graphical tile may include an icon with an upright stand to indicate that the corresponding play event is associated with a field goal or extra point. A graphical tile may include an icon with arms extended upright to indicate that the corresponding play event is associated with a score, such as a touch down. A graphical tile may include an icon with arms crossed to indicate that the corresponding play event is associated with a personal foul. Alternatively or additionally, a graphical tile may include an icon, such as a logo, for the team associated with the corresponding play event. Graphical tiles may include a plurality of icons and/or colors.

3.2 Play Event Icons

In FIG. 4A, FIG. 4B, FIG. 4C, and FIG. 4D, bar 450 includes play event icons 460, 462, 464, 466, and 468. Each of play event icons 460, 462, 464, 466, and 468 may be associated with, or may correspond to, a play event. Furthermore, each of play event icons 460, 462, 464, 466, and 468 may be associated with, or may correspond to, a graphical tile in graphical tile list 405. For the purpose of illustrating a clear example, assume play event icon 462 corresponds to the same play event as graphical tile 416. Accordingly, play event icon 462 may be associated with graphical tile 416. Similarly, play event icon 464 may correspond to the same play event as graphical tile 418. Accordingly, play event icon 464 with graphical tile 418.

Play event icons may be color coded based, at least in part, on the corresponding play event. For example, play event icon 462 may be shaded differently than play event icon 464. Furthermore, for the purpose of illustrating a clear example, assume that the play event that corresponds to play event icon 462 is associated with a first team. Accordingly, play event icon 462 may be displayed with a first color. Further assume that the play event that corresponds to play event icon 464 is associated with a second team. Accordingly, play event icon 464 may be displayed with a second, different color. The color(s) assigned to a play event icon may be designated in the play event icon's corresponding play event, or the team color(s) of the team associated with the corresponding play event.

Alternatively or additionally, a play event icon may visually correspond with the corresponding graphical tile. For example, play event icon 462 has cross-hatching similar to graphical tile 416. Likewise, play event icon 464 does not have cross-hatching since graphical tile 418 also does not have cross-hatching.

Play event icons may be visually different based, at least in part, on the types of plays the corresponding play event is associated with. For example, a play event icon may include an icon with an upright stand to indicate that the corresponding play event is associated with a field goal or extra point. A play event icon may include an icon with arms extended upright to indicate that the corresponding play event is associated with a score, such as a touch down. A play event icon may include an icon with arms crossed to indicate that the corresponding play event is associated with a personal foul. Alternatively or additionally, a play event icon may include an image, such as a logo, for the team associated with the corresponding play event.

The position of each play event icon in the bar may be based, at least in part, on the location of the corresponding graphical tile in the graphical tile list 405. For example, in FIG. 4B, expanded frame 454 covers play event icons 462 and 464 because corresponding graphical tiles 416 and 418 are currently in view within graphical tile list 405. Similarly, in FIG. 4D, expanded indicator 458 underscores play event icons 462 and 464 because corresponding graphical tiles 416 and 418 are currently in view within graphical tile list 405.

The position of each play event icon in the bar may be based, at least in part, on the starting and/or ending game clock time of the corresponding play event. For purposes of illustrating a clear example, assume that each quarter in a game is fourteen minutes long. As illustrated in graphical tile 418, the game clock starting time is approximately half way through the second quarter. Accordingly, play event icon 464, which corresponds with the same play event that graphical tile 418 corresponds to, is located approximately half the distance between markers 472 and 473, since markers 472 and 473 indicate the beginning of the second quarter and the third quarter, respectively.

A play event icon need not be displayed for all graphical tiles. For example, no play event icon precedes play event icon 464 during the second quarter, but a graphical tile is depicted in FIG. 4B that corresponds to a play event that starts with eight minutes and fifteen seconds left in the second quarter according to the game clock as illustrated in the graphical tile.

A play event icon may be displayed based, at least in part, on the corresponding play event indicating that the play event is marked as, or determined to be, important. For example, a play event may be determined to be important if any of the following are indicated in the play event: a different team has possession of the ball at the end of the play, a team scores, and/or a team has progressed the position of the ball a particular distance. Also for example, a play event may be determined to be important if an "important" field is selected. The "important" field may be selected automatically by an application or device distributing play events or by application 400. Alternatively or additionally, the "important" field may be selected manually by an operator or user, either before or after application 400 receives the play event.

3.3 Markers

In FIG. 4A, FIG. 4B, FIG. 4C, and FIG. 4D, bar 450 includes markers 471, 472, and 473. Markers may indicate particular milestones within a game, such as the beginning of a quarter, period, or overtime. For example, marker 471 marks the beginning of the first quarter of a game. Accordingly, marker 471 is labeled "Q1". Similarly, markers 472 and 473 indicate the beginning of the second quarter and the third quarter, respectively. Markers may also mark particular penalties or other milestones or times within a game. Markers need not be associated with any play event. Additionally or alternatively, markers may be associated with a time or timestamp corresponding to a game clock or other time.

The position of the markers in the bar may be based, at least in part, on the play event icons displayed in the bar. For example, marker 472, which indicates the beginning of the second quarter, precedes play event icons 462 and 464 in bar 450, because the play events corresponding to play event icons 462 and 464 take place during the second quarter as indicated in corresponding graphical tiles 416 and 418. Accordingly, marker 473 follows play event icons 462 and 464, since the position of marker 473 indicates the beginning of the third quarter.

The position of the markers in the bar may be based, at least in part, on the game clock or other time. For purposes of illustrating a clear example, assume that the length of the first quarter is the same as the length of the second quarter, at least according to the game clock. Accordingly, marker 471 may be the same distance from marker 472, as marker 472 is from marker 473.

3.4 Frames and Indicators

Frames and indicators may be used to visually indicate which graphical tiles are being displayed. For example, FIG. 4A and FIG. 4B illustrate a linearly movable and expandable frame, FIG. 4A illustrates collapsed frame 452 and FIG. 4B illustrates expanded frame 454. In the embodiment illustrated in FIG. 4A, displaying collapsed frame 452 nearest to the text, "LIVE", indicates that one or more of the present or most current play events, which have been received by application 400, are currently displayed as graphical tiles in graphical tile list 405. In the embodiment illustrated in FIG. 4B, expanded frame 454, which covers play event icons 462 and 464, indicates that corresponding graphical tiles 416 and 418 are currently visible in graphical tile list 405.

Alternatively or additionally, the frame, or a portion of the frame, may be selectable and may be used to scroll through graphical tiles. For example, in FIG. 4A and FIG. 4B, collapsed frame 452 and expanded frame 454 may be selected by a user. According to user input, the collapsed frame 452 and/or expanded frame 454 may move along bar 450. Furthermore, the graphical tiles that correspond with the play event icons covered by either collapsed frame 452 or expanded frame 454 may be visible in graphical tile list 405.

Alternatively or additionally, the graphical tiles listed in graphical tile list 405 may be scrolled through. Accordingly, an indicator in bar 450 may be updated to visually indicate which graphical tiles are currently displayed. For example, FIG. 4C and FIG. 4D illustrate a linearly movable and expandable indicator. FIG. 4C illustrates collapsed indicator 456. FIG. 4D illustrates expanded indicator 458. In the embodiment illustrated in FIG. 4C, displaying collapsed indicator 456 nearest to the text, "LIVE", indicates that one or more of the present or most current play events, which have been received by application 400, are currently displayed as graphical tiles in graphical tile list 405. In the embodiment illustrated in FIG. 4D, expanded indicator 458, which underscores play event icons 462 and 464, indicates that corresponding graphical tiles 416 and 418 are currently visible in graphical tile list 405.

Alternatively or additionally, a marker or scrubber may be used to indicate which graphical tiles may be visible in graphical tile list 405.

3.5 Video Scrub Bar

The scroll bar described herein may be displayed adjacent to, and/or associated with a video of one or more plays; each play may correspond to one or more play events. For example, a mobile application running on a mobile device may play a video of a drive comprising three plays, each play corresponding to a different play event. Accordingly, play event icons displayed in the scroll bar may be associated with, or correspond to, a play event represented in the video. Additionally or alternatively, the position of a play event icon may indicate the time and/or place in the video a particular play begins or ends, based, at least in part, on the corresponding play event. Additionally or alternatively, a play event icon may visually indicate which team has possession of the ball during a play in the video. Additionally or alternatively, a play event icon may visually indicate any other aspect of a play or play event described herein. Additionally or alternatively, portions of the scroll bar may be colored to indicate which team has possession of the ball. Additionally or alternatively, a frame or indicator may be used to depict which play is currently displayed in a video.

For purposes of illustrating a clear example, assume that a video comprises three plays, and that each of the three plays correspond to a play event. Accordingly, a scroll bar adjacent to the video may include three play event icons, each of which indicate at which point in the video the corresponding play begins. The scroll bar may also include a frame or indicator that depicts which play is currently being displayed. A frame or indicator may depict the location of the play head in the video.

3.6 Application

Application 400 may also be an application running on a computing device such as one of the mobile devices 40 of FIG. 1A. For example, application 400 may be a mobile application running on a mobile device, such as a mobile phone or tablet. Application 400 may also be an application running on a desktop or laptop computer.

Application 400 may be restricted, such that one or more features may be performed during select times and/or places. For example, application 400 may be configured to perform during a particular game, and may be configured to terminate performance of one or more features after the game has finished. Also for example, application 400 may be configured to perform one or more features while the device, which application 400 is running on, is within a particular distance from the location that the game is, or was, being played at, and to terminate performance of the one or more features otherwise.

4.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
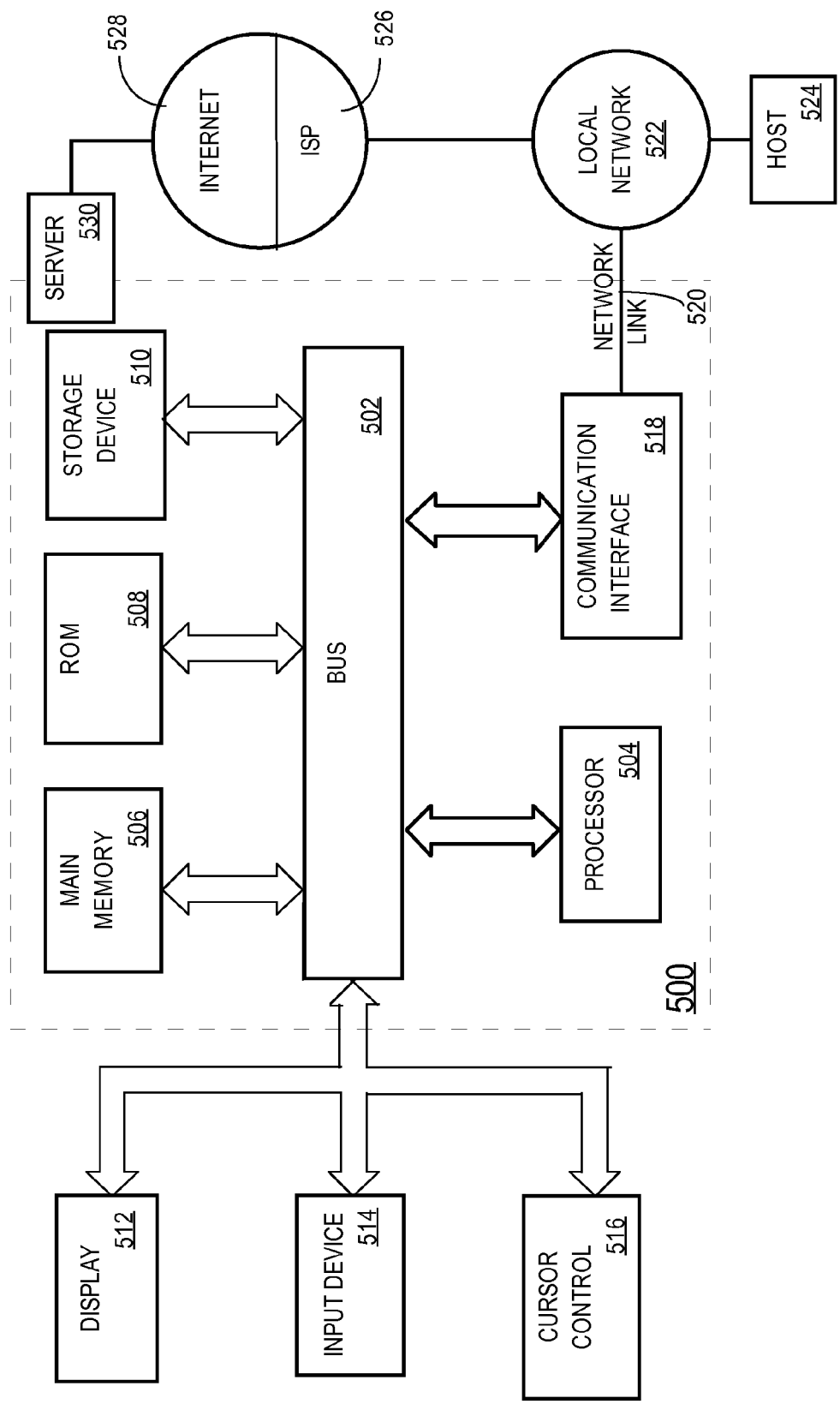
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a plurality of play events associated with an American football game that comprises a football and two sports teams, wherein each play event of the plurality of play events comprises a timestamp and represents all plays of a drive during which one sports team of the two sports teams possessed the football;
   for each play event in the plurality of play events, associating with the play event with the one sports team;
   for each event in the plurality of play events, associating with the play event a particular icon from among a plurality of different icons based, at least in part, on the sports team that is associated with the play event;
   wherein each icon of the plurality of different icons has a color based on which sports team is associated with the icon;
   causing to display a bar in a graphical user interface of a mobile computing device, wherein the bar represents at least a portion of a time duration of the American football game, wherein the bar visually indicates a change of game time quarter;
   causing to display an indicator that is interactively movable along the bar, wherein a length of the indicator corresponds to a time interval of the American football game and underscores one or more of the play events in the time interval;
   causing, in a panel, to display a graphical tile for each play event whose timestamp is included in the time interval;
   wherein the graphical tile of the play event has a particular color that represents a team that was in possession of the football at the time of the play event, wherein the particular color corresponds to the icon of the play event;
   for each play event in the plurality of play events, causing to display the particular icon at a particular linear position in the bar, wherein the position is based, at least in part, on the timestamp of the event;
   wherein the visual appearance of the particular icon is based on the sports team associated with the play event associated with the particular icon;
   causing to play a video that corresponds to multiple plays of a particular play event of the plurality of play events and as the video plays, causing to move the indicator along the bar to visually correlate a current time within the video with a time along the bar;
   wherein the method is performed by one or more computing devices.

2. The method of claim 1 comprising associating the particular icon with the play event based upon which sports team then currently possesses a ball during play of the American football game.

3. The method of claim 1 comprising:
   associating each play event of the plurality of play events with an event type;
   for each play event in the plurality of play events, determining the particular icon based, at least in part, on the event type that is associated with the event.

4. The method of claim 1, wherein each play event in the plurality of play events comprises an importance field, the method comprising:
   receiving a new play event comprising a new timestamp and a new importance field;
   determining that the new play event is important based, at least in part, on the importance field, and in response:
   associating the new play event with one of the two sports teams;
   determining a new particular icon based, at least in part, on the sports team that is associated with the new play event;
   causing to display the new particular icon in the bar, wherein a new position of the new particular icon in the bar is based, at least in part, on the new timestamp.

5. The method of claim 1 comprising:
   receiving a selection of a particular team;
   in response to the selection, filtering the plurality of play events and causing to display the icons that are associated with each play event in the plurality of play events that is associated with the particular team, and causing to not display of the icons that are associated with each play event in the plurality of play events that is not associated with the particular team.

6. The method of claim 1 comprising:
   associating each play event of the plurality of play events with an event type;
   receiving a selection of a particular event type;
   in response to the selection, filtering the plurality of play events and causing to display the icons that are associated with each play event in the plurality of play events that is associated with the particular event type, and causing to not display the icons that are associated with each play event in the plurality of play events that is not associated with the particular event type.

7. The method of claim 1 comprising:
receiving game play data;
in response to receiving the game play data, for each play event in the plurality of play events, updating the position of the icon in the bar for the play event.

8. The method of claim 1 comprising:
determining one or more times for one or more time markers, respectively, wherein each time marker of the one or more time markers includes a time;
for each time marker in the one or more time markers, causing to display a time marker icon in the bar, wherein a position of the time marker icon is based, at least in part, on the time of the time marker.

9. The method of claim 1, wherein the bar is a scroll bar, and comprising:
displaying the scroll bar adjacent to a scrollable set of graphical tiles; and
displaying, in each of the graphical tiles, data for one of the play events among the plurality of play events.

10. The method of claim 1, wherein the bar comprises a linearly movable and expandable frame that is displayed adjacent to a scrollable set of graphical tiles, each of the graphical tiles comprising data for one of the play events among the plurality of play events, and comprising:
causing to display the frame in a collapsed format at a present game point of the bar;
receiving input for sliding the frame along the bar away from the present game point;
causing to display the frame in an enlarged format that covers one or more of the icons and in a size that corresponds to a number of the graphical tiles that are displayed.

11. The method of claim 1, wherein the bar comprises a linearly movable and expandable frame, with a selectable portion, that is displayed adjacent to a scrollable set of graphical tiles, each of the graphical tiles comprising data for one of the play events among the plurality of play events, and comprising:
causing to display the frame in a collapsed format at a present game point of the bar;
receiving input for determining the selectable portion is selected;
receiving input for sliding the frame along the bar away from the present game point;
causing to display the frame in an enlarged format that covers one or more of the icons;
causing to display a set of graphical tiles that correspond with the one or more of the covered icons.

12. The method of claim 1, wherein the bar comprises a linearly movable and expandable indicator that is displayed within the bar, which is adjacent to a scrollable set of graphical tiles, each of the graphical tiles comprising data for one of the play events among the plurality of play events, and comprising:
causing to display the indicator in a collapsed format at a present game point of the bar;
receiving input for sliding the indicator along the bar away from the present game point;
causing to display the indicator in an enlarged format that underscores one or more of the icons and in a size that corresponds to a number of the graphical tiles that are displayed.

13. One or more non-transitory computer-readable media storing one or more sequences of instructions which, when executed by one or more computing devices, cause:
receiving a plurality of play events associated with an American football game that comprises a football and two sports teams, wherein each play event of the plurality of play events comprises a timestamp and represents all plays of a drive during which one sports team of the two sports teams possessed the football;
for each play event in the plurality of play events, associating the play event with the one sports team;
for each event in the plurality of play events, associating with the play event a particular icon from among a plurality of different icons based, at least in part, on the sports team that is associated with the play event;
wherein each icon of the plurality of different icons has a color based on which sports team is associated with the icon;
displaying a bar in a graphical user interface of a mobile computing device, wherein the bar represents at least a portion of a time duration of the American football game, wherein the bar visually indicates a change of game time quarter;
displaying an indicator that is interactively movable along the bar, wherein a length of the indicator corresponds to a time interval of the American football game and underscores one or more of the play events in the time interval;
displaying, in a panel, a graphical tile for each play event whose timestamp is included in the time interval;
wherein the graphical tile of the play event has a particular color that represents a team that was in possession of the football at the time of the play event, wherein the particular color corresponds to the icon of the play event;
for each play event in the plurality of play events, displaying the particular icon at a particular linear position in the bar, wherein the position is based, at least in part, on the timestamp of the event;
wherein the visual appearance of the particular icon is based on the sports team associated with the play event associated with the particular icon;
playing a video that corresponds to multiple plays of a particular play event of the plurality of play events and as the video plays, causing to move the indicator along the bar to visually correlate a current time within the video with a time along the bar.

14. The one or more non-transitory computer-readable media of claim 13, comprising instructions which when executed cause associating the particular icon with the play event based upon which sports team then currently possesses a ball during play of the American football game.

15. The one or more non-transitory computer-readable media of claim 13, comprising instructions which when executed cause:
associating each play event of the plurality of play events with an event type;
for each play event in the plurality of play events, determining the particular icon based, at least in part, on the event type that is associated with the event.

16. The one or more non-transitory computer-readable media of claim 13, wherein each play event in the plurality of play events comprises an importance field, and comprising instructions which when executed cause:
receiving a new play event comprising a new timestamp and a new importance field;
determining that the new play event is important based, at least in part, on the importance field, and in response:
associating the new play event with one of the two sports teams;

determining a new particular icon based, at least in part, on the sports team that is associated with the new play event;

causing to display the new particular icon in the bar, wherein a new position of the new particular icon in the bar is based, at least in part, on the new timestamp.

17. The one or more non-transitory computer-readable media of claim 13, comprising instructions which when executed cause:

receiving a selection of a particular team;

in response to the selection, filtering the plurality of play events and causing to display the icons that are associated with each play event in the plurality of play events that is associated with the particular team, and causing to not display of the icons that are associated with each play event in the plurality of play events that is not associated with the particular team.

18. The one or more non-transitory computer-readable media of claim 13, comprising instructions which when executed cause:

associating each play event of the plurality of play events with an event type;

receiving a selection of a particular event type;

in response to the selection, filtering the plurality of play events and causing to display the icons that are associated with each play event in the plurality of play events that is associated with the particular event type, and causing to not display the icons that are associated with each play event in the plurality of play events that is not associated with the particular event type.

19. The one or more non-transitory computer-readable media of claim 13, comprising instructions which when executed cause:

receiving game play data;

in response to receiving the game play data, for each play event in the plurality of play events, updating the position of the icon in the bar for the play event.

20. The one or more non-transitory computer-readable media of claim 13, comprising instructions which when executed cause:

determining one or more times for one or more time markers, respectively, wherein each time marker of the one or more time markers includes a time;

for each time marker in the one or more time markers, causing to display a time marker icon in the bar, wherein a position of the time marker icon is based, at least in part, on the time of the time marker.

21. The one or more non-transitory computer-readable media of claim 13, wherein the bar is a scroll bar, and comprising instructions which when executed cause:

displaying the scroll bar adjacent to a scrollable set of graphical tiles; and displaying, in each of the graphical tiles, data for one of the play events among the plurality of play events.

22. The one or more non-transitory computer-readable media of claim 13, wherein the bar comprises a linearly movable and expandable frame that is displayed adjacent to a scrollable set of graphical tiles, each of the graphical tiles comprising data for one of the play events among the plurality of play events, and comprising instructions which when executed cause:

causing to display the frame in a collapsed format at a present game point of the bar;

receiving input for sliding the frame along the bar away from the present game point;

causing to display the frame in an enlarged format that covers one or more of the icons and in a size that corresponds to a number of the graphical tiles that are displayed.

23. The one or more non-transitory computer-readable media of claim 13, wherein the bar comprises a linearly movable and expandable frame, with a selectable portion, that is displayed adjacent to a scrollable set of graphical tiles, each of the graphical tiles comprising data for one of the play events among the plurality of play events, and comprising instructions which when executed cause:

causing to display the frame in a collapsed format at a present game point of the bar;

receiving input for determining the selectable portion is selected;

receiving input for sliding the frame along the bar away from the present game point;

causing to display the frame in an enlarged format that covers one or more of the icons;

causing to display a set of graphical tiles that correspond with the one or more of the covered icons.

24. The one or more non-transitory computer-readable media of claim 13, wherein the bar comprises a linearly movable and expandable indicator that is displayed within the bar, which is adjacent to a scrollable set of graphical tiles, each of the graphical tiles comprising data for one of the play events among the plurality of play events, and comprising instructions which when executed cause:

causing to display the indicator in a collapsed format at a present game point of the bar;

receiving input for sliding the indicator along the bar away from the present game point;

causing to display the indicator in an enlarged format that underscores one or more of the icons and in a size that corresponds to a number of the graphical tiles that are displayed.

25. The method of claim 1, wherein only icons that represent scoring plays and new quarters are displayed in the bar.

26. The method of claim 1, wherein each icon of the plurality of different icons is associated with a color based on the uniform color of which sports team is associated with the icon or a logo based on which sports team is associated with the icon.

27. The one or more non-transitory computer-readable media of claim 13, wherein only icons that represent scoring plays and new quarters are displayed in the bar.

28. The one or more non-transitory computer-readable media of claim 13, wherein each icon of the plurality of different icons is associated with a color based on the uniform color of which sports team is associated with the icon or a logo based on which sports team is associated with the icon.

* * * * *